(12) United States Patent
Stewart

(10) Patent No.: US 6,535,610 B1
(45) Date of Patent: Mar. 18, 2003

(54) DIRECTIONAL MICROPHONE UTILIZING SPACED APART OMNI-DIRECTIONAL MICROPHONES

(75) Inventor: Brett B. Stewart, Austin, TX (US)

(73) Assignee: Morgan Stanley & Co. Incorporated, New York, NY (US)

( * ) Notice: Subject to any disclaimer, the term of this patent is extended or adjusted under 35 U.S.C. 154(b) by 0 days.

(21) Appl. No.: 08/598,098

(22) Filed: Feb. 7, 1996

(51) Int. Cl.[7] .............................. H04R 3/00; H03G 5/00
(52) U.S. Cl. ............................................ 381/92; 381/97
(58) Field of Search ......................... 381/97, 182, 169, 381/92

(56) References Cited

U.S. PATENT DOCUMENTS

| | | | |
|---|---|---|---|
| 4,521,908 A | 6/1985 | Miyaji et al. ................. 381/92 |
| 4,653,102 A | 3/1987 | Hansen ........................ 381/94 |
| 4,703,506 A | 10/1987 | Sakamoto et al. ............. 381/92 |
| 4,712,244 A | 12/1987 | Zwicker et al. ............. 381/68.1 |
| 4,712,247 A * | 12/1987 | Swarte ........................ 381/96 |
| 4,720,712 A | 1/1988 | Brookner et al. ........... 342/383 |
| 4,741,038 A | 4/1988 | Elko et al. .................... 381/92 |
| 4,802,227 A * | 1/1989 | Elko et al. .................... 381/92 |
| 5,193,117 A | 3/1993 | Ono et al. .................... 381/71 |
| 5,226,087 A | 7/1993 | Ono et al. .................... 391/92 |
| 5,233,664 A * | 8/1993 | Yanagawa et al. .......... 381/182 |
| 5,243,660 A | 9/1993 | Zagorski ...................... 381/92 |
| 5,260,920 A | 11/1993 | Ide et al. ....................... 369/5 |
| 5,291,556 A * | 3/1994 | Gale ............................. 381/24 |
| 5,301,363 A | 4/1994 | Hinderks .................... 455/101 |
| 5,327,143 A | 7/1994 | Goetz et al. ................ 342/382 |
| 5,347,586 A | 9/1994 | Hill et al. ..................... 381/71 |
| 5,367,506 A | 11/1994 | Inanaga et al. ................. 369/4 |
| 5,581,036 A * | 12/1996 | Chang et al. |

FOREIGN PATENT DOCUMENTS

| | | |
|---|---|---|
| EP | 0381498 | 2/1990 |
| EP | 0642290 | 9/1994 |
| GB | 2273848 | 8/1993 |
| WO | 95/31805 | 11/1995 |

OTHER PUBLICATIONS

B. Widrow, et al., "Adaptive Signal Processing", Prentice–Hall, Inc., Englewood Cliffs, NJ 07632, pp. 1, 3–4 and 368–369.

* cited by examiner

Primary Examiner—Forester W. Isen
Assistant Examiner—Laura A. Grier

(57) ABSTRACT

A sound processing apparatus includes a plurality of microphones spaced apart from each other, each microphone producing electrical signals representative of sound signals incident thereon. The sound processing apparatus also includes a signal processing unit that produces a specific direction sound signal by processing the electrical signals according to a specific sound direction. The plurality of microphones can be positioned about a periphery of a computer display, and adaptive beam forming techniques can be employed to provide a directional input sound signal for use in sound processing.

3 Claims, 9 Drawing Sheets

DIRECTIONAL MICROPHONE UTILIZING SPACED APART OMNI-DIRECTIONAL MICROPHONES

BACKGROUND OF THE INVENTION

1. Field of the Invention

The invention relates to the field of directional microphones. More particularly, the invention is directed to a directional microphone system including a plurality of omni-directional microphones and a signal processor that produces a beam in a selectable direction with a selectable width.

2. Related Art

Directional microphones are characterized by their ability to reject sounds which are off-axis from the direction the microphone is pointing. The angle of off-axis rejection defines a beam which originates at the microphone, radiates outward in the direction the microphone is pointing, and diverges along the angle of off-axis rejection. A microphone that forms a beam with a narrower angle can reject off-axis sounds to a greater extent than a microphone that forms a beam with a broader angle.

The directional characteristics of a microphone can be illustrated by a directivity pattern. The directivity pattern for a microphone is created by plotting the output power of the microphone, in decibels (Db), in response to a constant sound signal which is moved in one or more complete circular patterns around the microphone. The directivity pattern produced for a directional microphone (as opposed to an omni-directional microphone) is typically a cardioid lobe. The width of the lobe is called a beam width. For example, FIG. 7 shows a directivity pattern for a typical directional microphone pointed in a look direction 707 labelled M, which forms an angle θ with a reference axis X. The pattern 701 is created by plotting dB readings from microphone 703 in response to a constant sound source traversing the X-Y plane in a circular pattern 705. Directivity pattern 701 indicates that microphone 703 will be responsive to sounds with an amplitude equal to that of the constant sound source when these sounds are internal to directivity pattern 701, for example, at point 715, and will reject similar sounds when they are external to directivity pattern 701, for example, at point 717.

Directional microphones are used in numerous devices, such as speakerphones, tape recorders, and intercoms. More recently, computer-based devices have utilized directional microphones for speech recognition, teleconferencing, and in multi-media systems.

A conventional directional microphone has a fixed directivity pattern. Conventional microphones achieve directionality and noise cancellation by combinations of enclosure design, diaphragm design, and baffling. For example, an objective of an aviation microphone is to respond to only the user's voice in an environment containing high noise ambients. In order to achieve this objective, the microphone is designed to be positioned on a boom close to the user's mouth and in such a position that noise ambients are delivered to both sides of the diaphragm. The diaphragm is designed to be relatively stiff and therefore insensitive. The user's speech creates a high sound pressure level on only one side of the microphone, thereby allowing a signal to be produced. A conventional studio microphone also achieves directionality through diaphragm, enclosure, and baffling design. However, in a studio environment, less extreme combinations of these three design parameters are required because the noise ambients are significantly less than in an aviation environment.

In order to effectively use such a microphone, the user must speak from within a region defined by the directivity pattern of the microphone. For example, the user cannot move too far off center from the direction the microphone is pointing because the user's speech would be rejected by the microphone as an off-axis sound. Thus, the user must physically change the orientation of the microphone, and thereby change the angle of its directivity pattern, whenever the user moves to a location outside of the beam width. In a computer teleconference using such a conventional directional microphone, for example, a user could initially point the microphone to pick up his or her voice. If, during the conference, the user changes position, the user may then have to re-position the microphone to be directed to the user's new position in order to enable the microphone to pick up the user's voice.

If the microphone cannot be re-positioned, however, the user is constrained to remain in a relatively fixed location. For example, if a speakerphone with a directional microphone is mounted to a wall, and the microphone has a fixed position, the speakerphone will only respond to the user's voice when the user is in front of the speakerphone. If the user walks around the room while speaking, such that the user is not always within the directivity pattern of the microphone, the user's voice cuts in and out as the user crosses the path of the beam.

Occasionally, it is desirable to share a microphone among a number of users. An example is a teleconference involving multiple parties in the same room. To be effective in such an application, a conventional directional microphone must be re-positioned for each user. For example, the microphone can be continuously passed around to the person presently speaking. In such a situation, a microphone with a wider beam or an omni-directional microphone would be more effective. However, an omni-directional microphone has drawbacks in that noise from extraneous sources will not be rejected. For example, noise from an air conditioning system, a fan connected to an overhead projector, or noise from a conversation among a subset of parties may interfere with the voice of the intended speaker.

Thus, a conventional directional microphone is effective when a user is speaking from within the directivity pattern of the microphone and maintains a relatively fixed position. However, a conventional directional microphone is not effective when a user is in motion relative to the microphone or when sounds from multiple dispersed sound sources are to be sensed.

SUMMARY OF THE INVENTION

It is an object of the invention to provide a microphone system which provides the benefits of a directional microphone without the commensurate drawbacks. Specifically, it is an object of the invention to provide a microphone system that can reject noise from extraneous sources while maintaining effectiveness in a setting, such as a conference room, where the intended sound source can change position or move from one specific source to another, for example, from one person to another.

It is further an object of the invention to provide a directional microphone which includes a plurality of omni-directional microphones and a signal processor. More generally, it is an object of the invention to provide a directional microphone with a selectably steerable beam and selectably adjustable beam width.

The above and other objects of the invention are accomplished by a sound processing device including a plurality of microphones spaced apart from each other and a signal processing unit. Each microphone produces electrical signals representative of sound signals incident thereon. The signal processing unit receives the electrical signals and produces a specific direction sound signal by processing the electrical signals according to a specific sound direction. The sound processing device might further include an analog to digital converting unit which receives analog electrical signals from the microphones and produces corresponding digital electrical signals. The signal processing unit can produce the specific direction sound signal by weighting each digital signal according to the specific sound source direction and adding the weighted digital signals. A further advantageous feature of the sound processing device according to the invention includes a selector coupled to the sound processing unit for providing a signal which identifies the specific sound direction.

The above and other objects of the invention are also accomplished by a method of receiving sound information into a sound processing device from a specific direction. The method includes the steps of (1) receiving a sound wave into a plurality of microphones and sampling a signal representing the sound wave from each microphone at sampling times to obtain sampled signals, and (2) processing the sampled signals to obtain a composite signal, where the processing enhances sound waves received from the specific direction. In one embodiment according to the invention, the processing includes weighting sampled signals at each of the sampling times to produce weighted signals, the weighting being determined according to the specific direction, and summing the weighted signals to form the composite signal. In another embodiment according to the invention, the sampling times are determined separately for each microphone based on the specific direction.

BRIEF DESCRIPTION OF THE DRAWINGS

The above and other objects are accomplished according to the invention described herein with reference to drawings in which.

DETAILED DESCRIPTION

Figure 1:
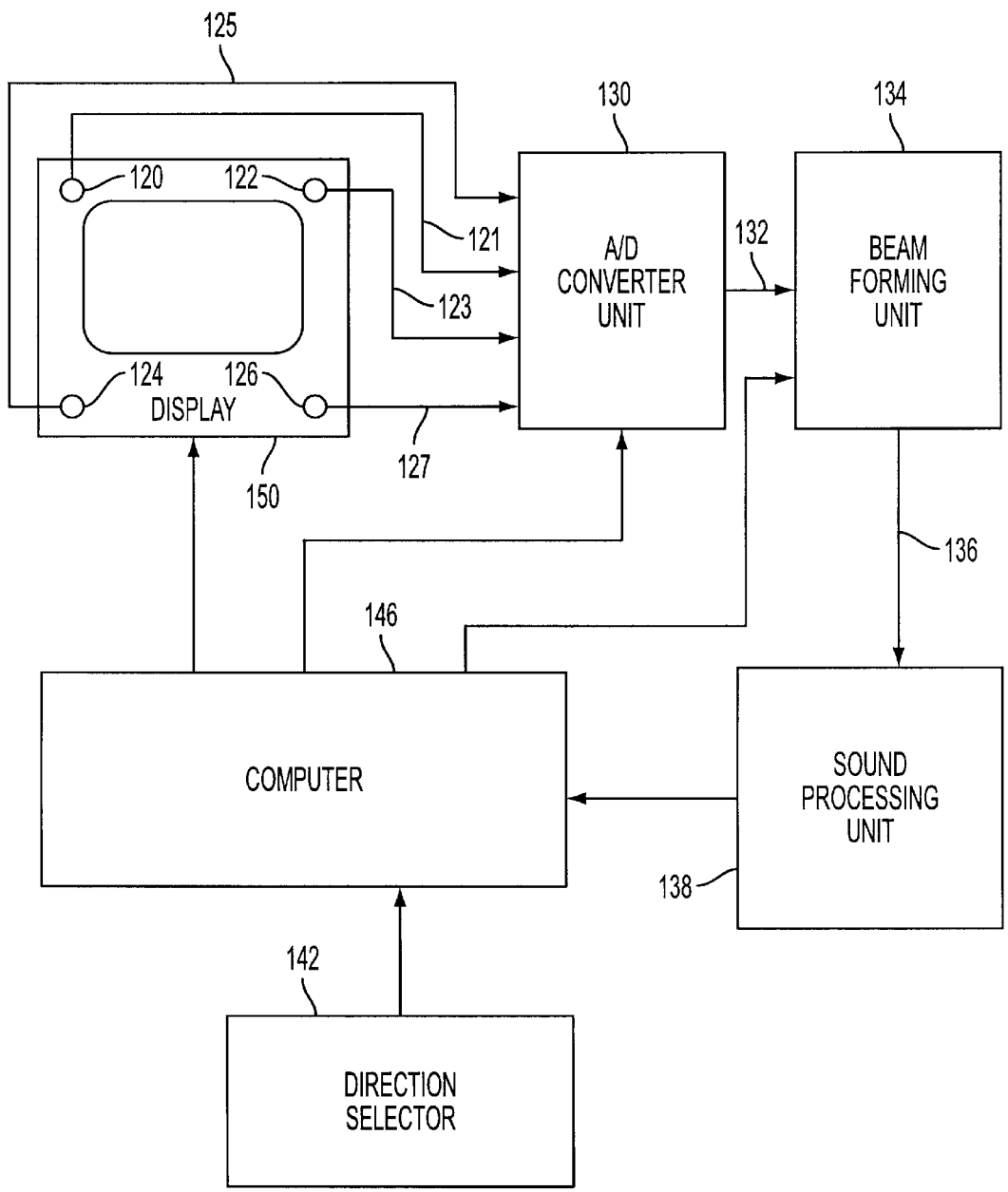
FIG. 1 is a system diagram of a sound processing system according to the invention.

FIG. 1 shows a sound processing system according to the invention including omni-directional microphones 120, 122, 124, and 126 positioned in the corners of a display 150, an analog to digital (A/D) converter unit 130, a direction selector 142, a beam forming unit 134, a sound processing unit 138, and a computer 146. The direction selector 142 provides a signal indicating a specific direction to the computer 146. The microphones 120, 122, 124, and 126 respectively provide analog audio signals 121, 123, 125 and 127 to the A/D converter unit 130. The computer 146 supplies sampling times to the A/D converter unit 130 according to the specific direction. The A/D converter unit 130 samples the analog signals at the supplied sampling times and converts the analog signals to digital signals 132. The A/D converter unit provides the digital signals 132 to the beam forming unit 134. The computer 146 also supplies information to the beam forming unit 134 according to the specific direction. The beam forming unit 134 processes the digital signals 132 according to the information supplied by the computer 146 to produce a composite signal 136. The composite signal is supplied to the sound processing unit 138 which is further coupled to the computer 146.

Figure 2:
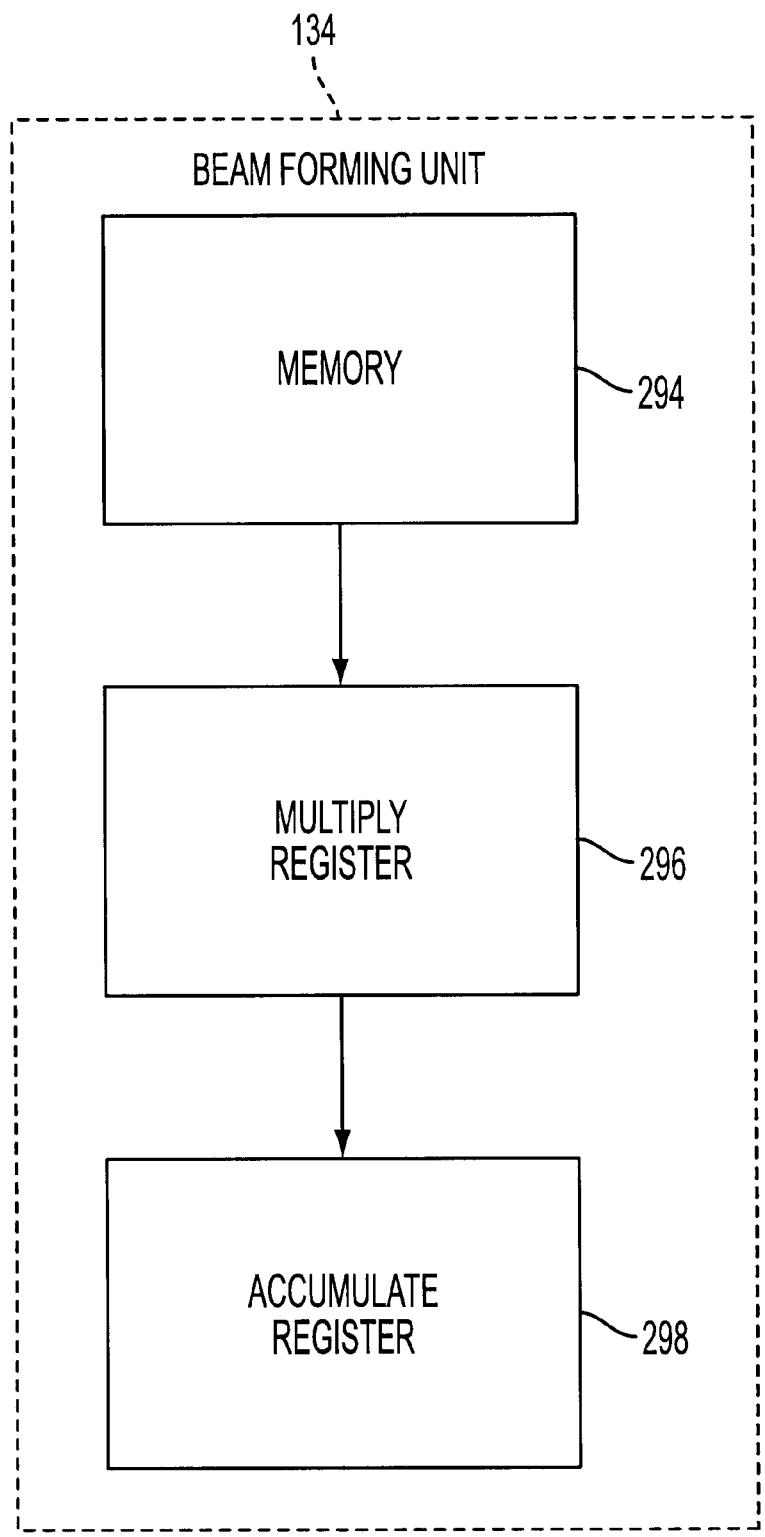
FIG. 2 is a method of beam forming according to the invention.

FIG. 2 shows an example of a beam forming unit 134 which includes a memory 294, a multiply register 296, and an accumulate register 298. The memory 294 supplies two data values to the multiply register 296. The multiply register 296 multiplies the data values and supplies a result to the accumulate register 298. The accumulate register 298 adds the supplied result to a previous value held in the accumulate register 298.

Figure 2A:
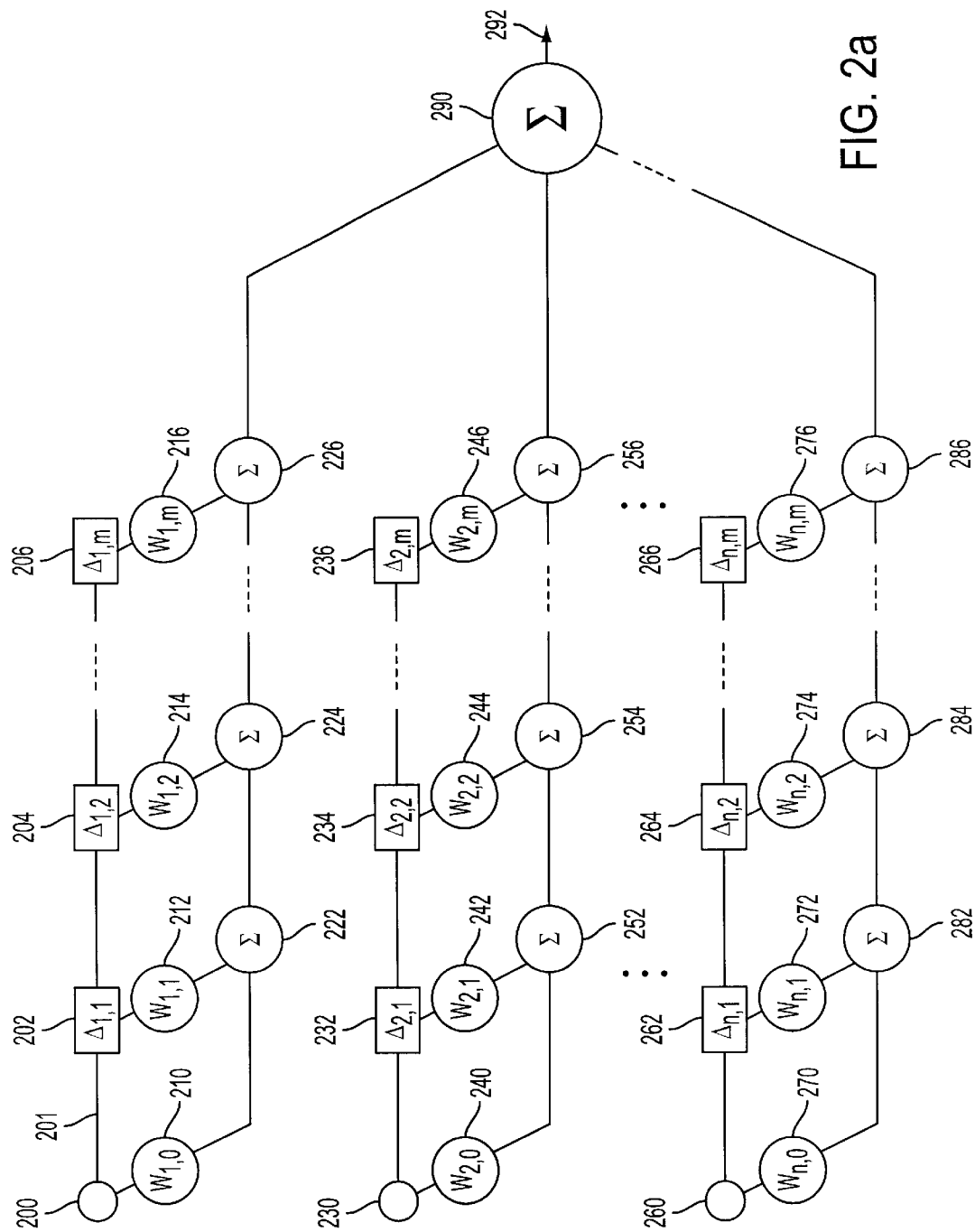
FIG. 2a is a beam forming unit according to the invention.

Referring to FIG. 2a, a process of a beam forming is shown which can be implemented in the beam forming unit 134 of FIG. 1 as detailed in FIG. 2. Input node 200 represents an input signal. For example, the input signal could correspond to one of the digital signals 132 of FIG. 1 from a single microphone, for example, the signal from microphone 120 of FIG. 1. Referring to FIG. 2, the input signal would be held in digital form in memory 294.

The line 201 connecting elements 200, 202, 204 . . . 206 represents the input signal as it varies with time. Data values taken further along the line relative to input node 200 are increasingly later in time. For example, element 202 represents a data value sampled later in time than the data value for input node 200, the data value for element 204 was sampled after the data value for element 202, and so on. Line 201 can thus be thought of as a delay line 201 tapped at delay nodes 202, 204 . . . 206. The delay nodes 202, 204 . . . 206 have corresponding relative delay times $\Delta_{1,1-m}$. For example, the data value for input node 200 is sampled at a nominal time $t_o$, the data value for delay node 202 is sampled at $t_1$, which corresponds to $t_0+\Delta_{1,1}$, the data value for delay node 204 is sampled at $t_2$, which corresponds to $t_1+\Delta_{1,2}$, and so on through delay node 206.

In the example of FIGS. 1 and 2, the data values of digital signals 132 are held in memory 294 with reference to the times the data values were sampled. For example, the data value corresponding to sample time $t_0$ is held at a first memory address, the data value for $t_1$ is held at a second memory address, and so on.

According to the method shown in FIG. 2a, a first data value, corresponding to an input signal tapped at input node 200 at a nominal instant in time to, is multiplied by a weighting node 210 with a weighting factor $W_{1,0}$ to produce a first weighted data value. The next data value, corresponding to the input signal tapped at delay node 202 at the instant in time $t_1$, is multiplied by weighting node 212 with a weighting factor $W_{1,1}$ to produce a next weighted data value. This process continues for each delay node 204 . . . 206.

Referring to FIG. 2, this process is accomplished by reading the data values corresponding to instances in time $t_{0-m}$ from memory 294. Weighting factors $W_{1,0-m}$ are also held in memory 294. The data values are sequentially supplied to multiply register 296 with their corresponding weighting factors. The multiply register 296 multiplies each data value by its corresponding weighting factor to produce weighted data values.

The next step in the process of FIG. 2a is that the first weighted data value from weighting node 210 and the next weighted data value from weighting node 212 are supplied to summing node 222 which adds the two values together to produce a first accumulated value. The first accumulated value and the weighted data value from weighting node 214 are supplied to summing node 224 to produce a next accumulated value. This process continues through weighting node 216 which is supplied to summing node 226 to produce a first total accumulated value for input node 200.

This step is accomplished in the beam forming unit 134 shown in FIG. 2 by, first, initializing the accumulate register 298 to a pre-determined value. Next, the weighted data values from the multiply register 296 are supplied to the accumulate register 298. The accumulate register 298 adds the supplied weighted data values to the previous value of the accumulate register 298 to form a new value for the accumulate register.

Referring back to the process shown in FIG. 2a, input node 230 is similarly arranged with delay nodes 232, 234 . . . 236, weighting nodes 240, 242, 244 . . . 246, and summing nodes 252, 254 . . . 256 to produce a second total accumulated value for input node 230. Input node 260 is also similarly arranged with delay nodes 262, 264 . . . 266, weighting nodes 270, 272, 274 . . . 276, and summing nodes 282, 284 . . . 286 to produce an nth total accumulated value for input node 260. Finally, total accumulated data values 1 through n are supplied to summing junction 290 which adds them together to produce composite signal 292.

In a beam forming unit 134 as detailed in FIG. 2, the accumulate register 298 simply continues to accumulate the supplied weighted data values. The composite signal for an instant in time is produced by the summation of all weighted data values as the process moves from the data values for a first input signal through the data values for each subsequent input signal. A beam or a plurality of beams can be formed and steered by choosing appropriate delay times, $\Delta_{1-n,1-m}$, and weighting factors, $W_{1-n,1-m}$. The textbook *Adaptive Signal Processing*, written by Widrow and Stearns and published by Prentice-Hall (1985), incorporated herein by reference, discusses beam steering methods related to adaptive beam forming, which is a subset of beam forming.

An advantage is provided in that the directivity pattern of a microphone system according to the invention can be controlled by choosing appropriate delay times, $\Delta_{1-n,1-m}$, and weighting factors, $W_{1-n,1-m}$. For example, a microphone system according to the invention can have a directivity pattern consisting of a single lobe in a desired direction. Alternatively, the microphone can have a directivity pattern including a plurality of lobes. A microphone with such a directivity pattern is responsive to sounds from a plurality of directions, but still rejects sounds outside the regions of the lobes. The width of the lobe(s) in either of the above examples can be controlled to selectively widen or narrow the region in which the microphone is responsive to sounds.

Figure 3:
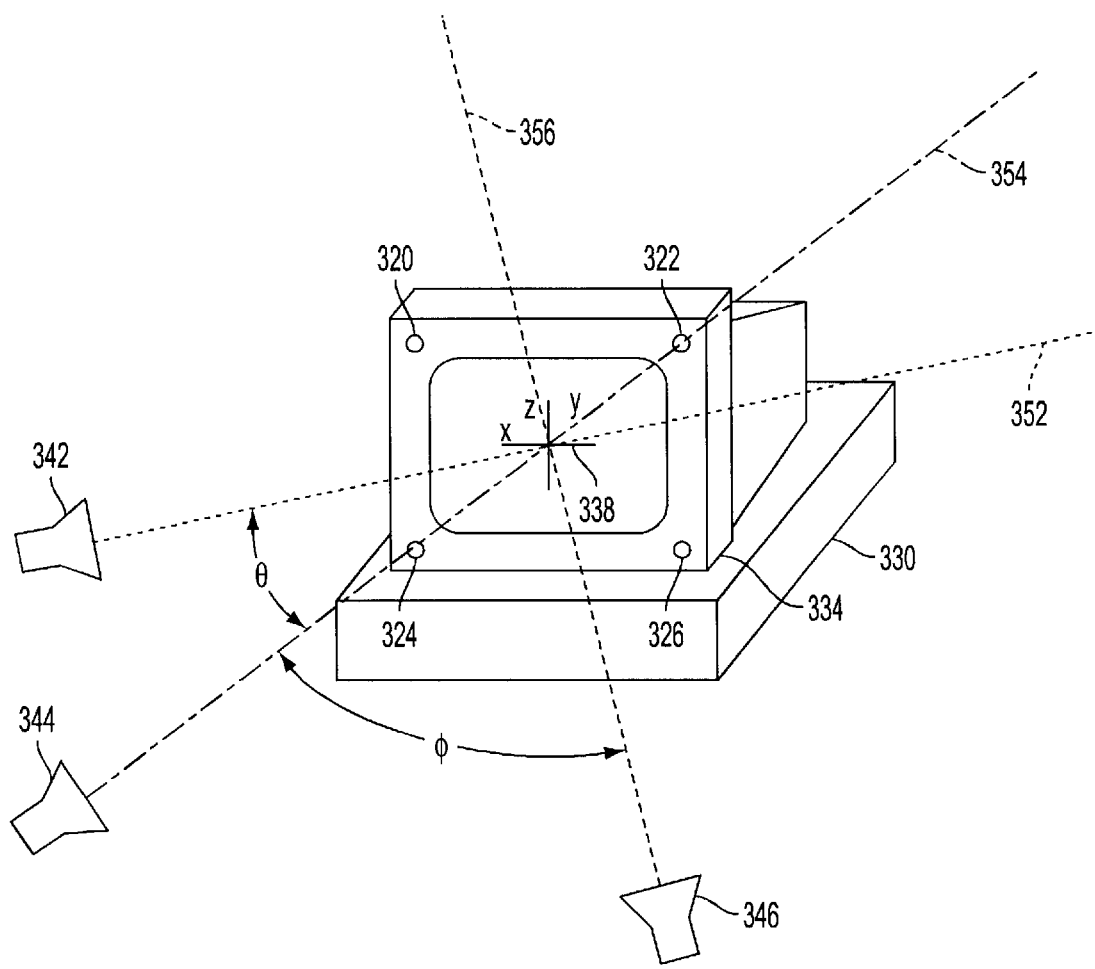
FIG. 3 is a desk top computer sound processing system according to the invention operating in a representative sound field.

FIG. 3 shows an embodiment according to the invention having omni-directional microphones 320, 322, 324, and 326 positioned in the corners of a display 334 which is coupled to a computer 330. A sound field is represented by sound sources 342, 344, and 346 which produce sound along axes 352, 354, and 356, respectively.

A three dimensional cartesian coordinate axis 338 is shown near the center of the display 334 for reference. The y-axis is aligned with axis 354 from sound source 344. Sound sources 342 and 346 are aligned with sound source 344 in the X-Y plane, but are off-axis from axis 354 by angles of θ and φ respectively.

An advantage is provided by the ability to focus on a desired sound source. For example, if sound source 344 was a user of the computer 330 and sound sources 342 and 346 were interferences such as fan noise from an air conditioner or another nearby computer, a microphone system according to the invention could, for example, steer a beam to point along axis 354 in the direction of sound source 344 and narrow the beam width to exclude sound sources 342 and 346.

A further advantage of such a microphone system is the ability to selectively focus on more than one desired sound source. As discussed earlier, a microphone system according to the invention can form a plurality of beams to selectively respond to or reject sounds from a plurality of directions. For example, if sound sources 344 and 346 represent users of the computer, such as in a teleconferencing application, and source 342 represents undesirable fan noise, a first beam could be steered to point along axis 354 in the direction of sound source 344 and a second beam could be steered to point along axis 356 in the direction of sound source 346. The widths of the first and second beams could be narrowed to exclude sound source 342. Thus, a microphone system according to the invention can operate in such an application to respond to the users while rejecting the noise. Moreover, additional beams could be formed to accommodate additional users who join the conference. While an arrangement using conventional directional microphones would require one (1) directional microphone per user, a single microphone system according to the invention can accommodate a plurality of users without further hardware requirements.

A further advantage of a microphone system according to the invention is that a microphone does not have to positioned to point in the direction of the desired sound source. In the example of FIG. 3, a user can orient the display 334 in an optimum position for viewing without having to consider the orientation relative to the user's voice. Once the user is satisfied with the display orientation, the user can steer a beam in a desired direction to focus on the user's voice.

Another example which illustrates the above advantage is a wall mounted speakerphone. The mounting location of such a phone is restricted to a plate on a wall which provides an outlet for a telephone connection. Such a speakerphone would typically utilize an omni-directional microphone to pick up all voices in the area. However, an omni-directional microphone has the drawback of also responding to undesirable sounds in the area such as noise. One might try to improve noise exclusion by utilizing a conventional directional microphone. However, such a speakerphone would then require the user to speak within a relatively narrow region in front of the speakerphone. A speakerphone with a microphone system according to the invention, however, could allow the user to steer a beam in any desired direction and adjust a width of the beam to selectively narrow or widen the responsive region.

Another advantage provided by a microphone system according to the invention is that the microphone does not require physical repositioning to focus in a different desired direction. For example, if a user of the computer 330 in FIG. 3 moves from the position indicated by sound source 344 to the position indicated by sound source 342, a conventional microphone has to be physically repositioned from pointing along axis 354 to pointing along axis 352. A microphone system according to the invention, however, can simply steer a beam along the new direction of axis 352 without physical repositioning. A feature of a microphone system according to the invention is that such repositioning can be done either automatically as the user moves about or selectively under user control.

Figure 4:
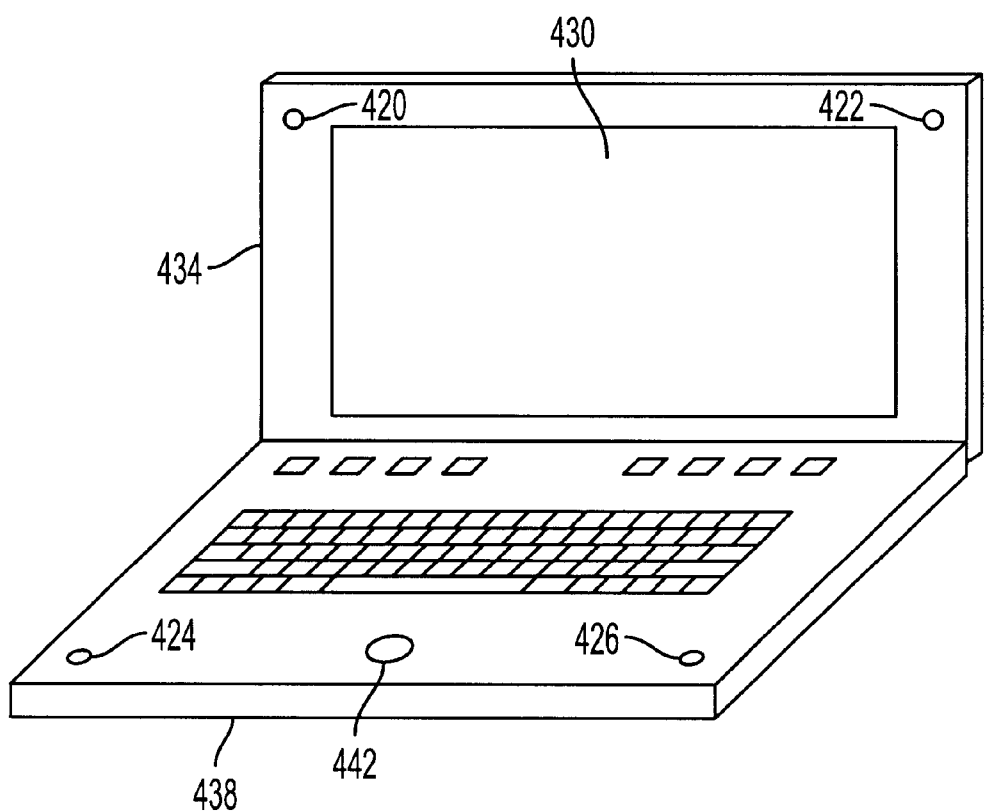
FIG. 4 is a laptop computer sound processing system according to the invention.

FIG. 4 shows another embodiment of the invention including a laptop computer 430 having a display portion 434 and a base portion 438. Omni-directional microphones 420 and 422 are located at the top corners of the display portion 434. Omni-directional microphones 424 and 426 are located at the bottom corners of the base portion 438. Computer 430 includes a conventional audio transducer 442 in the base portion 438.

It will be understood that, in each embodiment of the invention disclosed herein, the positions of the omni-directional microphones are exemplary positions and other positions are possible. In FIG. 4, for example the microphones could be fixedly positioned at the corners of the screen. However, the distance between microphones is a factor, with a greater distance being preferable. Therefore, it may be preferable in the embodiment according to FIG. 4 to position the microphones as shown.

However, one disadvantage to positioning the omni-directional microphones as shown in FIG. 4 is that the distance between microphones varies with the angle of the display portion 434 relative to the base portion 438. A user may adjust the angle, for example, to obtain a better viewing angle or reduce glare. The distance between the microphones is important because it impacts an anticipated delay factor for a desired sound signal. The anticipated delay factor in turn affects the choice of appropriate delay times, $\Delta_{1-n,1-m}$, and weighting factors, $W_{1-n,1-m}$.

A feature of a microphone system according to the invention in FIG. 4 is that the distance between microphones 420 and 424 (which is the same distance as between microphones 422 and 426) can be automatically determined and supplied to the computer 430. The computer 430 can then utilize the information supplied as part of the beam forming process. The automatic determination of the distance may include, for example, mechanical sensing of the angle of the display portion 434 relative to the base portion 438. The computer can compute the distance between the microphones based on this angle. An angle sensor can therefore be incorporated into the laptop computer 130 to provide a signal to the computer 130 representing this angle. Alternatively, the determination of the distance may include electrical sensing by means of infra-red emitters and sensors. Another alternative includes self-calibration by the microphones 420–426. For example, the microphones 420–426 can each produce audible outputs, such as a tone which is in turn be detected at the other microphones, thereby allowing precise measurement of the delay between the microphones. The precise delay measurement provides an accurate calculation of the delays and weights desired for each microphone to perform adaptive beam forming. Alternatively, the computer 430 can include a conventional audio transducer 442, as shown, for example, in the base portion 438, such that transducer 442 can generate the self-calibration tones.

Figure 5:
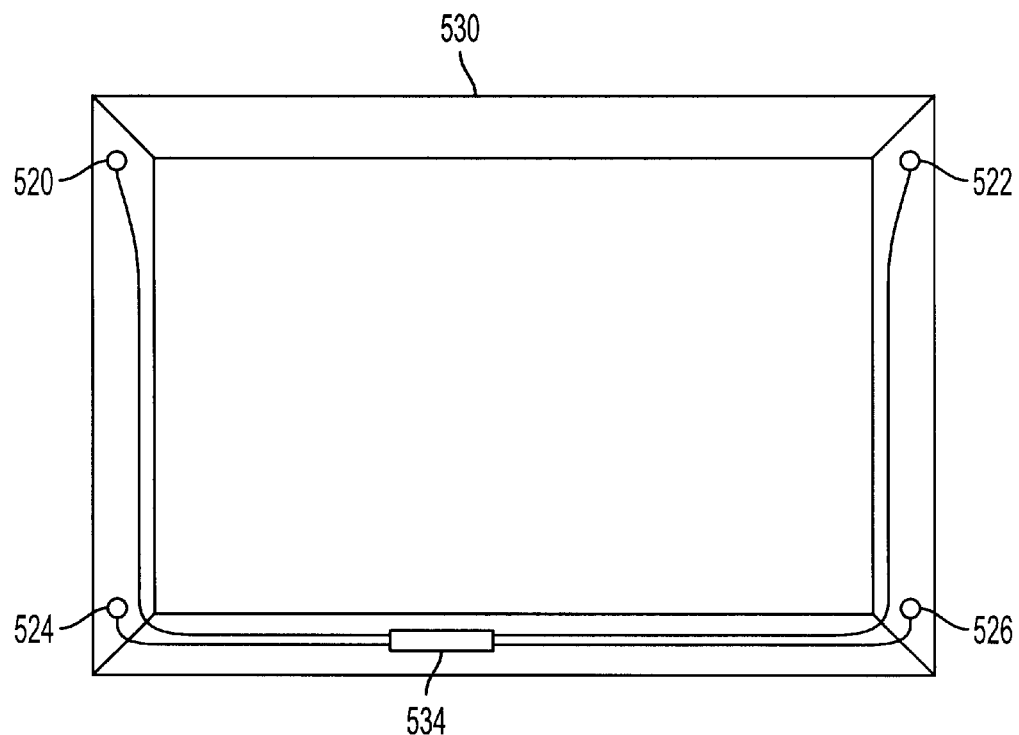
FIG. 5 is a microphone system according to the invention.

FIG. 5 shows another embodiment including a directional microphone system having omni-directional microphones 520, 522, 524, and 526 positioned at the corners of a picture frame 530. The microphones are coupled to a communication device 534. The communication device 534 may include a cable which is physically connected to an apparatus, such as a computer, or, alternatively, the device 534 may include wireless communication with an apparatus. The beam forming may take place within the communication device 534, the external apparatus, or some combination thereof.

As previously discussed, a potential limitation of a microphone system according to the invention is based on the distance between the omni-directional microphones. A microphone is characterized, among other things, by its frequency response measured in Hertz (Hz). The range of human hearing begins at approximately 20 Hz (low pitched sounds) and continues through approximately 20,000 Hz (high pitched sounds). As the omni-directional microphones of a microphone system according to the invention are spaced closer together, the frequency response at the low end range (nearer to 20 Hz) is attenuated. The embodiment of FIG. 5 therefore has an advantage of providing physical spacing between the omni-directional microphone elements of the microphone system which is greater than that possible if the elements are integrated in to a smaller application, such as a personal computer.

Figure 6:
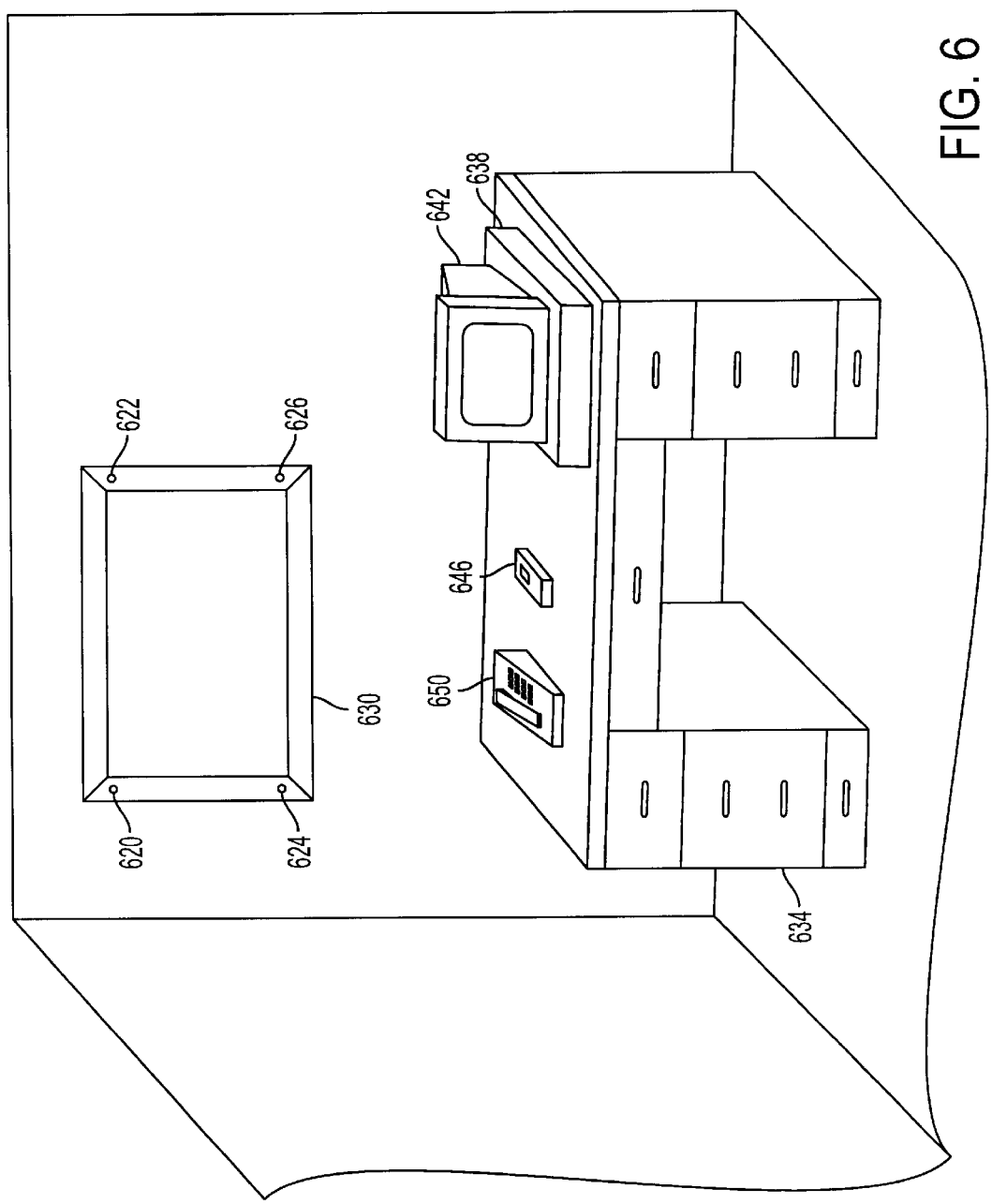
FIG. 6 is a microphone system according to the invention shown in a representative office environment.
Figure 7:
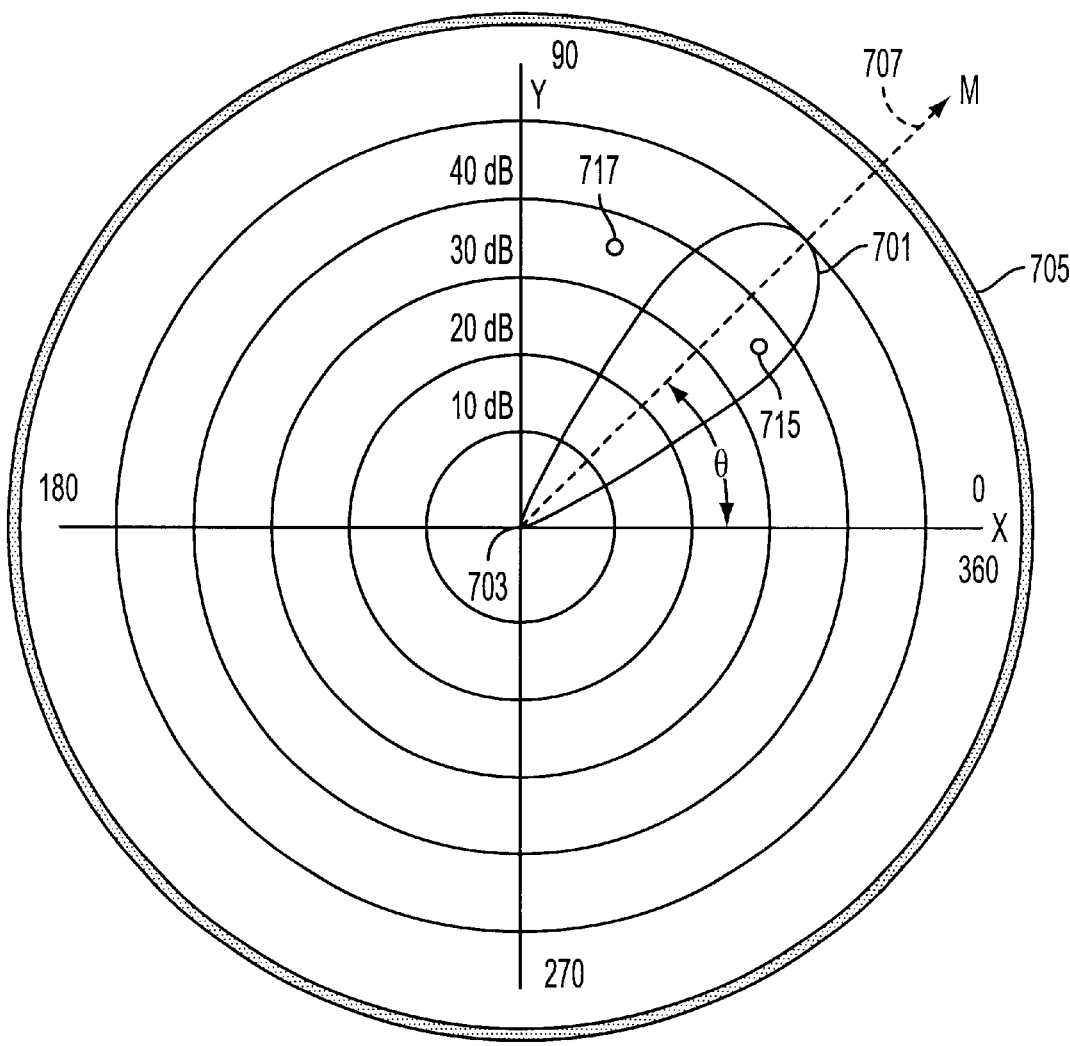
FIG. 7 shows a representative directivity pattern of a directional microphone.

In FIG. 6, an embodiment according to invention is shown in a representative office environment. A picture frame 630 has omni-directional microphones 620, 622, 624, and 626 positioned at its corners. A computer 638 with a display 642, a speakerphone 650, and a tape recorder 646 are located on top of a desk 634.

An advantage is provided in that a single microphone system 630 can supply a signal to a plurality of devices without repositioning the microphone 630 when the user changes position to use one of the plurality of devices.

Those skilled in the art will appreciate that the advantages described with respect to the foregoing embodiments are applicable to the generation of sound as well as to the detection of sound. In other words, by substituting speakers for microphones in the foregoing embodiments, or co-locating speakers with the microphones, adaptive beam forming techniques can enhance audibility along a beam direction and suppress audibility off-axis from the beam direction.

Figure 8:
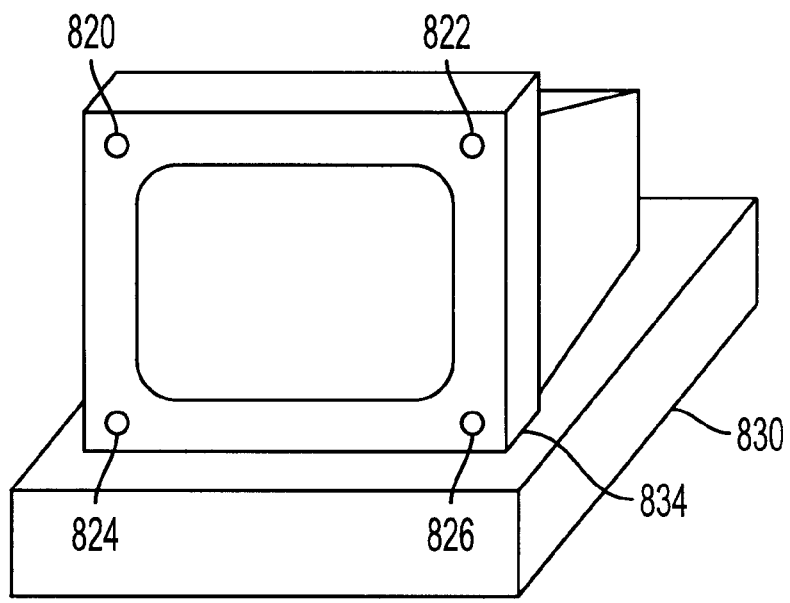
FIG. 8 shows an embodiment having transducers which can function as speakers or as combinations of microphones and speakers.

FIG. 8 shows an embodiment according to the invention in which a computer 830 is coupled to a display 834. The display 834 has transducers 820, 822, 824, and 826 positioned about its periphery. Transducers 820, 822, 824, and 826 may function solely as speakers or as combination microphones and speakers. Alternatively, display 834 may be configured with both microphones and speakers about its periphery.

This design enhances privacy of audio communications, for example, in a video teleconference wherein some participants are in an open office environment, such as a conference room or a large area segmented by individual work stations. According to the invention, by using the beam forming techniques described herein to control the microphones, a person communicating via the video conference with a group of participants located in an open office environment would generally hear only the desired speaker. Also according to the invention, by using the beam forming techniques described herein to control the speakers, the desired listener would generally be the only one to hear the person appearing by-video.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A sound processing apparatus comprising:

a computer;

a display operatively coupled to the computer;

a sound processing unit operatively controlled by the computer;

a plurality of microphones positioned about a periphery of the display, each microphone receiving a sound signal and producing an analog signal representative of said sound signal;

an analog to digital converter circuit sampling the analog signal from each microphone at variable sampling intervals determined by the computer and producing a digital signal corresponding to each sampled analog signal;

a selector providing a specific sound direction signal; and a signal processing unit receiving the specific sound direction signal and said digital signals and processing said digital signals according to the specific sound direction signal to produce, as input to the sound processing unit, a directional input sound signal.

2. The sound processing apparatus of claim 1, wherein the selector utilizes adaptive beam forming techniques to provide the directional input sound signal.

3. A sound processing system comprising:

a computer;

a sound processing unit controlled by the computer;

a display connected to the computer;

a first microphone positioned at the top left corner of the display and connected to a first analog to digital converter to produce a first microphone signal;

a second microphone positioned at the top right corner of the display and connected to a second analog to digital converter to produce a second microphone signal;

a third microphone positioned at the bottom right corner of the display and connected to a third analog to digital converter to produce a third microphone signal;

a fourth microphone positioned at the bottom left corner of the display and connected to a fourth analog to digital converter to produce a fourth microphone signal;

a first tapped delay line connected to the first microphone signal, wherein said first tapped delay line comprises a plurality of taps at adjustable relative time delays, each tap multiplied by an adjustable weight factor, and each tap added to a subsequent weight adjusted tap to produce a first microphone output signal;

a second tapped delay line connected to the second microphone signal, wherein said second tapped delay line comprises a plurality of taps at adjustable relative time delays, each tap multiplied by an adjustable weight factor, and each tap added to a subsequent weight adjusted tap to produce a second microphone output signal;

a third tapped delay line connected to the third microphone signal, wherein said third tapped delay line comprises a plurality of taps at adjustable relative time delays, each tap multiplied by an adjustable weight factor, and each tap added to a subsequent weight adjusted tap to produce a third microphone output signal;

a fourth tapped delay line connected to the fourth microphone signal, wherein said fourth tapped delay line comprises a plurality of taps at adjustable relative time delays, each tap multiplied by an adjustable weight factor, and each tap added to a subsequent weight adjusted tap to produce a fourth microphone output signal;

a direction setting element responsive to an external signal to set said adjustable relative time delays and said adjustable weight factors to form and steer a beam having a selectively adjustable width in a direction specified by the external signal; and an output of the signal processing unit comprising the sum of the first, second, third, and fourth microphone output signals connected to the sound processing unit.

* * * * *